(12) United States Patent
Schneider

(10) Patent No.: US 11,220,234 B1
(45) Date of Patent: Jan. 11, 2022

(54) OCCUPANT RESTRAINT SYSTEM FOR A VEHICLE SEAT INCLUDING ADAPTIVE VENTING

(71) Applicant: AUTOLIV ASP, INC., Ogden, UT (US)

(72) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/070,275

(22) Filed: Oct. 14, 2020

(51) Int. Cl.
*B60R 21/239* (2006.01)
*B60R 21/231* (2011.01)
*B60R 21/2338* (2011.01)
*B60R 21/207* (2006.01)
*B60R 21/2342* (2011.01)

(52) U.S. Cl.
CPC .......... *B60R 21/239* (2013.01); *B60R 21/207* (2013.01); *B60R 21/2338* (2013.01); *B60R 21/2342* (2013.01); *B60R 21/23138* (2013.01); *B60R 2021/23146* (2013.01); *B60R 2021/23386* (2013.01)

(58) Field of Classification Search
None
See application file for complete search history.

(56) References Cited

U.S. PATENT DOCUMENTS

| | | | |
|---|---|---|---|
| 10,189,432 B2 | 1/2019 | Matsushita et al. | |
| 2019/0248323 A1 | 8/2019 | Saito et al. | |
| 2020/0331421 A1 * | 10/2020 | Saito | B60R 21/207 |
| 2020/0406855 A1 * | 12/2020 | Saito | B60R 21/2338 |

FOREIGN PATENT DOCUMENTS

| | | | | |
|---|---|---|---|---|
| KR | 20210065627 A * | 6/2021 | | B60R 21/207 |
| WO | 2019107053 A1 | 6/2019 | | |
| WO | 2019107073 A1 | 6/2019 | | |
| WO | 2020017281 A1 | 1/2020 | | |
| WO | WO-2020064449 A1 * | 4/2020 | | B60R 21/23 |

* cited by examiner

*Primary Examiner* — Faye M Fleming
(74) *Attorney, Agent, or Firm* — Harness, Dickey & Pierce, P.L.C.; Stephen T. Olson

(57) ABSTRACT

An occupant restraint system for a seat of a vehicle includes an airbag and an external tensioning member. The airbag is deployable from the seat and includes at least one cushion vent hole for venting inflation gases from the airbag. The tensioning member is attachable to the seat and includes at least a first webbing elongated between a first end and a second end. The first webbing including at least one webbing hole such that each cushion vent hole of the at least one cushion vent hole has a corresponding webbing hole from the at least one webbing hole. A releasable connection releasably connects the first webbing and the airbag to normally maintain alignment between each cushion vent hole and the corresponding webbing hole in response to a predetermined tension in the tensioning member to misalign each cushion vent hole with the corresponding webbing hole.

20 Claims, 2 Drawing Sheets

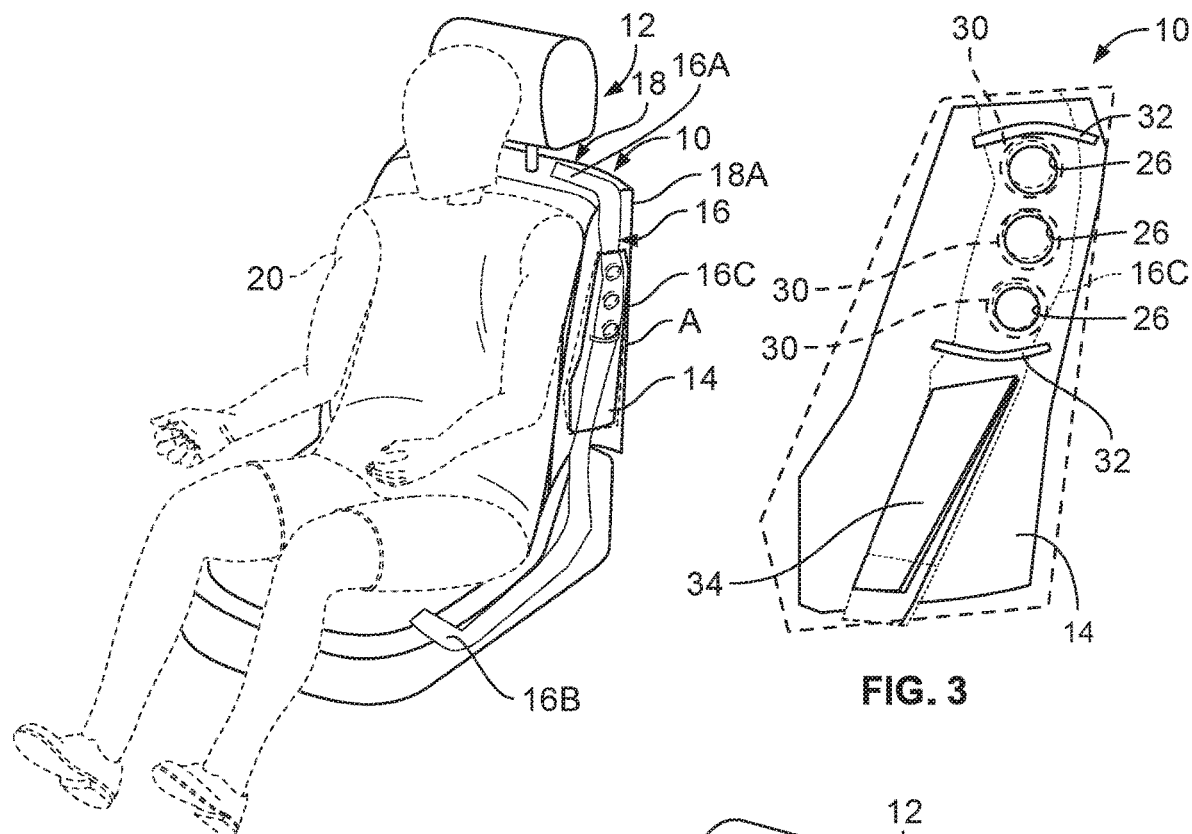
FIG. 2
FIG. 3
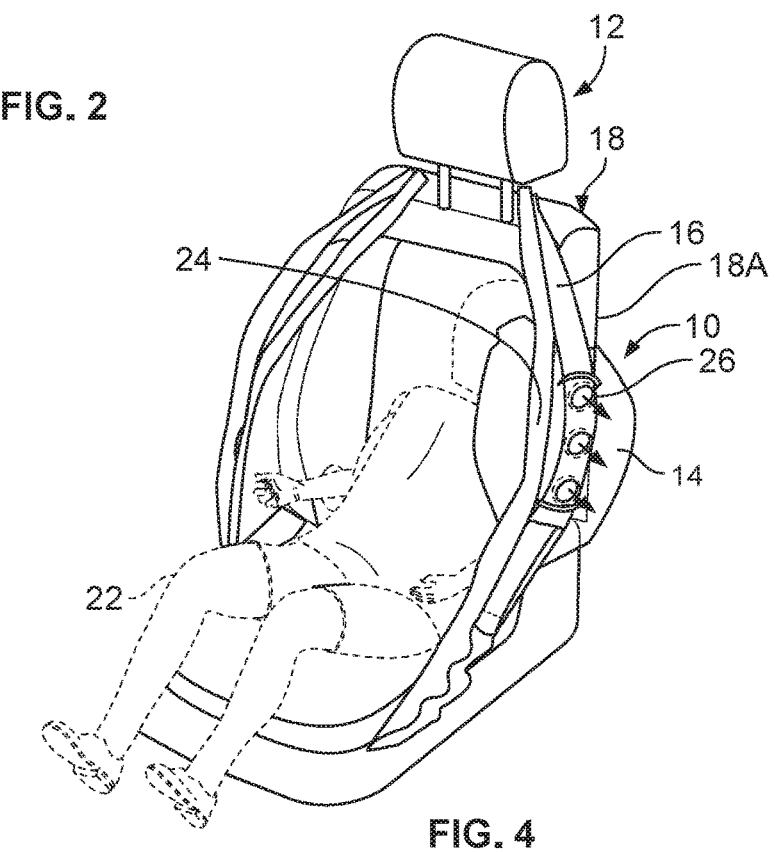
FIG. 4

OCCUPANT RESTRAINT SYSTEM FOR A VEHICLE SEAT INCLUDING ADAPTIVE VENTING

FIELD

The present disclosure generally concerns seat integrated occupant restraint systems. More particularly, the present disclosure relates to an occupant restraint system for a vehicle seat including adaptive venting.

BACKGROUND

This section provides background information related to the present disclosure which is not necessarily prior art.

Inflatable occupant restraints or airbags are commonly included on motor vehicles. In the event of an accident, a sensor within the vehicle measures abnormal deceleration, for example, and triggers inflation of the airbag within a few milliseconds with gas produced by a device commonly referred to as an "inflator". The inflated airbag cushions the vehicle occupant from impact forces.

It is generally known to provide a vehicle seat with airbags arranged to deploy from the vehicle seat on laterally opposing sides of a seat occupant. To a more limited extent, it is known in the art to a seat-centric, inflatable restraint system that exclude external tension members or wrap-around belts (WABs) that function as airbag reaction surfaces. One such occupant restraint system for a vehicle seat is shown and described in U.S. Pat. No. 10,189,432. This patent generally discloses right and left airbags normally stored in right and left sides of a seat back of the seat, respectively. The tension members are connected to both of the airbags and the vehicle seat. Upon inflation and deployment of the airbags, the tension members operate to maintain a desired positioning of the airbags to thereby more securely restrain the occupant. U.S. Pat. No. 10,189,432 is incorporated by reference as if fully set forth herein.

While known occupant restraint systems for vehicle seats, including the occupant restraint system of U.S. Pat. No. 10,189,432, have generally proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide an external tensioning arrangement for a seat-centric, inflatable restraint system that better protects an out-of-position (OOP) occupant.

It is a related object of the present teachings to provide adaptive venting for an airbag of a seat-centric, inflatable restraint system that functions to quickly vent inflation gases from the airbag to reduce airbag pressure when the airbag deployment is obstructed by an OOP occupant.

In accordance with one particular aspect, the present teachings provide an occupant restraint system for a seat of a vehicle. The occupant restraint system includes an airbag and a tensioning member. The airbag is deployable from the seat and includes at least one cushion vent hole for venting inflation gases from the airbag. The tensioning member has a first portion attachable to the seat at a first location and a second portion attachable to the seat at a second location. The tensioning member includes at least a first webbing elongated between the first portion and the second portion, the first webbing including at least one webbing hole such that each cushion vent hole of the at least one cushion vent hole has a corresponding webbing hole from the at least one webbing hole. A releasable connection releasably connects the first webbing and the airbag to normally maintain alignment between each cushion vent hole and the corresponding webbing hole in response to a predetermined tension in the tensioning member to misalign each cushion vent hole with the corresponding webbing hole.

In accordance with another particular aspect, the present teachings provide an occupant restraint system for a seat of a vehicle an airbag deployable from the seat and a tensioning member releasably attached to the airbag. The airbag includes at least one cushion vent hole for venting inflation gases from the airbag. The tensioning member is operative in a first position relative to the airbag when attached to the airbag and in a second position relative to the airbag upon detachment from the airbag. In the first position, the tensioning member allows the inflation gases to vent from the airbag through the at least one cushion vent hole and in the second position the tensioning member at least substantially blocks the inflation gases from venting from the airbag through the at least one cushion vent hole.

In accordance with yet another particular aspect, the present teachings provide a method of operating an occupant restraint system including an airbag deployable from a seat of a vehicle. The method includes attaching a tensioning member to the vehicle seat to provide an airbag reaction surface upon inflation of the airbag. The tensioning member is releasably secured to the airbag with the tensioning member in a first position relative to the airbag. The tensioning member includes at least one vent hole. Each vent hole of the tensioning member aligns with a corresponding cushion hole of the airbag when the tensioning member is in the first position. When the airbag is deployed, the occupant restraint system operates in one of a first mode and a second mode. In the first mode, the tensioning member is released from the airbag and the tensioning member moves to a second position relative to the airbag in which the vent holes of the tensioning member are not aligned with the cushion holes of the airbag. In the second mode, the first position of the tensioning member relative to the airbag is maintained and the airbag is vented through the cushion holes of the airbag.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a perspective view similar to FIG. 1 illustrating the occupant restraint system of FIG. 1 prior to deployment.

FIG. 3 is an enlarged side view of the detail shown in Area A of FIG. 2.

FIG. 4 is another perspective view similar to FIG. 1 illustrating the occupant restraint system in accordance with the present teachings with an out-of-position occupant and the occupant restraint system shown after deployment.

DETAILED DESCRIPTION

Figure 1:
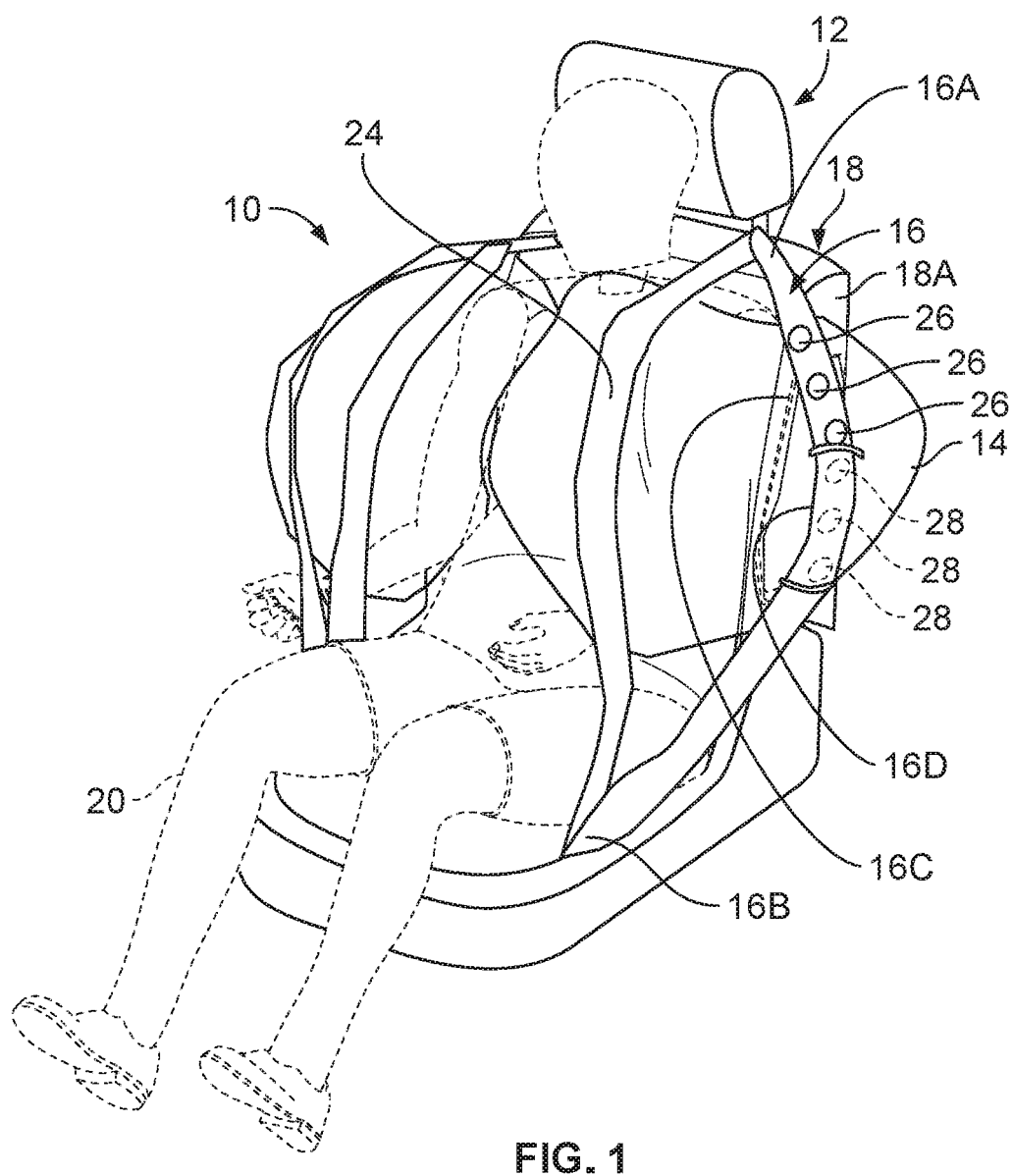
FIG. 1 is a perspective view of an occupant restraint system for a vehicle seat in accordance with the present teachings, the occupant restraint system shown operatively associated with an exemplary vehicle seat and shown after deployment protecting an occupant seated in the vehicle seat.

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance, and does not necessarily mean special or preferred.

With general reference to the drawings, an occupant restraint system in accordance with the present teachings is illustrated and generally identified at reference character 10. The occupant restraint system 10 is particularly adapted for a seat 12 of a vehicle. The seat or vehicle seat 12 may have a dedicated location within a vehicle or may be movably located within a vehicle, including but not limited to an autonomous vehicle. It will be understood that the particular vehicle seat 12 shown in the drawings is merely exemplary. In this regard, various aspects of the present teachings may be readily adapted for use with various other vehicle seats.

The occupant restraint system 10 is generally shown to include at least a first airbag 14 and at least a first tether or first external tensioning member 16. The first airbag 14 is carried by and deployable from a first lateral side 18A of a seatback 18 of the seat 12. In the particular embodiment illustrated, the first airbag 14 is carried by and deployable from the first lateral side or left lateral side 18A of the seatback 18. The occupant restraint system 10 of the present teachings will be described as the system 10 relates to the first lateral side 18A of the seat 12. It will be understood, however, that the present teachings may be applied to both lateral sides of the seat 12. Except as otherwise described herein, the construction and operation of the airbag 14, including mounting to and deployment from the seat 12, will be understood to be exemplary insofar as the present teachings are concerned. Explaining further, other airbag mountings and airbag configurations may be adapted for use within the scope of the present teachings.

As will become more apparent below, the occupant restraint system 10 of the present teachings is operative to adaptively vent inflation gases from the airbag 14 by operating in a first mode to normally inflate the airbag to protect a properly seated occupant 20 and operating in a second mode to vent inflation gases from the airbag 14 to protect an out-of-position occupant 22. As used herein, the term "properly seated occupant" will be understood to refer to a seat occupant that does not interfere or substantially interfere with normal deployment of the airbag 14. The term "out-of-position occupant" will refer to a seat occupant that interferes or substantially interferes with normal deployment of the airbag 14. The first mode of operation is shown in FIG. 1. The second mode of operation is shown in FIG. 4.

The tensioning member 16 is mounted to the seat 12 and conventionally functions to provide a reaction surface for the airbag 14. As shown in the particular embodiment illustrated, an additional tensioning member 24 may be incorporated. The tensioning member 16 includes a first portion or first end 16A secured to the seat 12 above the airbag 14 and a second portion or second end 16B secured to the seat 12 below the airbag 14. Prior to deployment of the airbag 14 (as shown in FIG. 2), the tensioning member 16 routes along the first lateral side 18A of the seatback 18. For purposes of illustration, the drawings have omitted certain trim components that would otherwise cover the airbag 14 and tensioning member 16 prior to deployment.

The tensioning member 16 includes a first webbing 16C elongated between the first portion 16A and the second portion 16B. The first webbing or vent portion 16C of the tensioning member 16 includes at least one vent hole or webbing hole 26. The airbag 14 includes a corresponding number of vent holes or cushion holes 28. Each cushion hole 28 aligns with a corresponding webbing hole 26 when the occupant restraint system operates in the second mode.

The tensioning member 16 is releasably secured to the airbag 14 with the tensioning member 16 in a first position relative to the airbag 14. In this first position, the webbing holes 26 of the tensioning member 16 are aligned with the cushion holes 28 of the airbag 14. This first position of the tensioning member 16 relative to the airbag 14 is shown in FIGS. 2 and 3 prior to deployment of the occupant restraint system 10 and in FIG. 4 after deployment of the occupant restraint system 10.

The tensioning member 16 may be releasably secured to the airbag 14 with tear stitching 30. In the embodiment illustrated, the tear stitching 30 circumferentially surrounds each of the cooperating pairs of webbing holes 26 in the tensioning member 16 and cushion holes 28 of the airbag 14. Alternatively, tear stitching may be located above and below the cooperating pairs of holes 26 and 28 or along the sides of the cooperating pairs of holes 26 and 28.

The tear stitching 30 securing the tensioning member 16 in the first position relative to the airbag 14 may be torn or broken in response to a predetermined tensioning of the tensioning member 16. Such predetermined tensioning of the tensioning member 16 will occur upon normal inflation of the airbag 14 when the airbag functions to protect a properly seated occupant 20. In response to this tension of the tensioning member 16 and tearing of the tear stitches 30, the tensioning member 16 translates from a first position relative to the airbag 14 to a second position relative to the airbag 14. In this second position, which is shown in FIG. 1, a solid portion 16D of the tensioning member 16 covers the cushion holes 28 of the airbag to block or substantially block inflation gases from venting out of the airbag 14 through the cushion holes 28. In this regard, it will be understood that the tensioning member 16 sufficiently covers the cushion holes 28 to result in normal or full deployment of the airbag 14. It will be understood that the term "block" or "substantially block" does not connote a sealing of the tensioning member 16 to the airbag 14 and further understood that there will be some leakage of inflation gases from the cushion holes 28 despite the full deployment of the airbag 14.

Movement of the tensioning member 16 from the first position to the second position may be guided by one or more guide members 32. In the embodiment illustrated, the guide members are first and second guide loops 32 that are secured to the airbag 14 and extend across the tensioning member 16. The guide loops 32 are not attached to the tensioning member 16 and the tensioning member 16 may freely translate relative to the guide loops 32 when not secured to the airbag 14 with the tear stitching 30.

As shown particularly in the detail view of FIG. 3, a portion 34 of the tensioning member 16 may be folded over on itself and held in place by a tear stitch 36. For the properly seated occupant, initial inflation of the airbag 14 will tear the tear stich 36 holding the folder over portion 34 in place and further inflation of the airbag 14 will take up resulting slack in the folded over portion 34 and otherwise in the tensioning member 16.

As shown in FIG. 4, an out-of-position occupant 22 may be directly or partially in the deployment path of the airbag 14. In this condition, deployment of the airbag 14 may be obstructed and proper positioning of the tensioning member 16 may be prevented. The slack in the tensioning member 16 will not be sufficiently removed to tension the tensioning member 16 to tear the tear stitching 30 connecting the tensioning member 16 to the airbag 14. As a result, the webbing holes 30 of the tensioning member 16 remain aligned with cushion holes 28 of the airbag 14 and inflation gases quickly vent out of the airbag 14.

It will now be appreciated that the present teachings provide an occupant restraint system for a vehicle seat with adaptive venting. The system includes aligning holes on a tensioning member 16 and the airbag 14 that misalign in response to tension in the tensioning member 16 from normal airbag inflation 14 with a properly positioned seat occupant. When the seat occupant is out-of-position and blocks normal deployment of the airbag 14, the holes in the tensioning member 16 and the airbag 14 remain aligned and inflation gases are quickly vented from the airbag 14.

While a specific embodiment and application of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. An occupant restraint system for a seat of a vehicle, the occupant restraint system comprising:
    an airbag deployable from the seat, the airbag including at least one cushion vent hole for venting inflation gases from the airbag;
    a tensioning member having a first portion attachable to the seat at a first location and a second portion attachable to the seat at a second location, the tensioning member including at least a first webbing elongated between the first portion and the second portion, the first webbing including at least one webbing hole such that each cushion vent hole of the at least one cushion vent hole has a corresponding webbing hole from the at least one webbing hole; and
    a releasable connection releasably connecting the first webbing and the airbag to normally maintain alignment between each cushion vent hole and the corresponding webbing hole in response to a predetermined tension in the tensioning member to misalign each cushion vent hole with the corresponding webbing hole.

2. The occupant restraint system of claim 1, wherein the first webbing includes a first segment including the at least one webbing hole and a second segment without webbing holes for transitioning over the at least one cushion vent hole to close the at least one cushion hole following release of the releasable connection.

3. The occupant restraint system of claim 1, wherein the releasable connection includes tear stitching.

4. The occupant restraint system of claim 3, wherein the tear stitching circumferentially surrounds each of the webbing holes.

5. The occupant restraint system of claim 1, wherein the first webbing includes an overlapping portion that is folded over and unfolds upon inflation of the airbag.

6. The occupant restraint system of claim 2, further comprising a guide arrangement for guiding the second segment to transition over the at least one cushion vent hole.

7. The occupant restraint system of claim 6, wherein the guide arrangement includes at least one guide loop secured to the airbag, the first webbing passing through the at least one guide loop.

8. The occupant restraint system of claim 1 in combination with the seat, the airbag carried by a seatback of the seat, the first and second portions of the tensioning member attached to the seat.

9. A method of restraining an occupant seated on the seat with the occupant restraint system of claim 1, the method comprising:
    operating the system in a first mode such that each cushion vent hole is aligned with the corresponding webbing hole; or
    operating the system in a second mode such that a solid area of the first webbing covers each cushion vent hole.

10. The method of claim 9, wherein the first webbing is translated relative to the airbag to transition the system from the first mode to the second mode.

11. An occupant restraint system for a seat of a vehicle, the occupant restraint system comprising:
    an airbag deployable from the seat, the airbag including at least one cushion vent hole for venting inflation gases from the airbag;
    a tensioning member releasably attached to the airbag, the tensioning member operative in a first position relative to the airbag when attached to the airbag and in a second position relative to the airbag upon detachment from the airbag such that in the first position the tensioning member allows the inflation gases to vent from the airbag through the at least one cushion vent hole and in the second position the tensioning member at least substantially blocks the inflation gases from venting from the airbag through the at least one cushion vent hole.

12. The occupant restraint system of claim 11, wherein the tensioning member is releasably attached to the airbag with tear stitching.

13. The occupant restraint system of claim 12, wherein the tensioning member includes a plurality of venting holes and the tear stitching circumferentially surrounds each of the venting holes.

14. The occupant restraint system of claim 11, wherein the tensioning member includes a venting portion including at least one venting hole such that each cushion vent hole of the at least one cushion vent hole is aligned with a corresponding venting hole from the at least one venting hole when the tensioning member is releasably attached to the airbag.

15. The occupant restraint system of claim 13, wherein the tensioning member further includes a blocking portion for overlapping the at least one webbing hole when the tensioning member is released from the airbag.

16. The occupant restraint system of claim 13, wherein the tensioning member is released from the airbag upon a predetermined tensioning of the tensioning member.

17. The occupant restraint system of claim 11, wherein the tensioning member translates from the first position to the second position.

18. A method of operating an occupant restraint system including an airbag deployable from a seat of a vehicle, the method comprising:

attaching a tensioning member to the seat to provide an airbag reaction surface upon inflation of the airbag;

releasably securing the tensioning member to the airbag with the tensioning member in a first position relative to the airbag, the tensioning member including at least one vent hole each vent hole of the tensioning member aligning with a corresponding cushion hole of the airbag when the tensioning member is in the first position;

deploying the airbag; and operating the restraint system in one of a first mode and a second mode such that in the first mode the tensioning member is released from the airbag and the tensioning member moves to a second position relative to the airbag in which the vent holes of the tensioning member are not aligned with the cushion holes of the airbag and in the second mode the first position of the tensioning member relative to the airbag is maintained and the airbag is vented through the cushion holes of the airbag.

19. The method of claim 18, wherein the tensioning member is moved from the first position to the second position in response to a predetermined tensioning of the tensioning member.

20. The occupant restraint system of claim 1, wherein releasably securing the tensioning member to the airbag includes securing the tensioning member to the airbag with tear stitching.

* * * * *